(12) United States Patent
Welch et al.

(10) Patent No.: US 8,615,912 B2
(45) Date of Patent: Dec. 31, 2013

(54) ILLUMINATED GRAPHICAL AND INFORMATION DISPLAY

(75) Inventors: David Charles Welch, Somerset (GB); Peter Servaas, Den Hague (NL)

(73) Assignee: Avery Dennison Corporation, Mentor, OH (US)

( * ) Notice: Subject to any disclaimer, the term of this patent is extended or adjusted under 35 U.S.C. 154(b) by 390 days.

(21) Appl. No.: 12/664,416

(22) PCT Filed: Jun. 14, 2007

(86) PCT No.: PCT/US2007/014095
§ 371 (c)(1),
(2), (4) Date: Dec. 14, 2009

(87) PCT Pub. No.: WO2008/153528
PCT Pub. Date: Dec. 18, 2008

(65) Prior Publication Data
US 2010/0180476 A1    Jul. 22, 2010

(51) Int. Cl.
G09F 3/18    (2006.01)

(52) U.S. Cl.
USPC .............................................. 40/546; 40/541

(58) Field of Classification Search
USPC .................................................. 40/546, 541
See application file for complete search history.

(56) References Cited

U.S. PATENT DOCUMENTS

| | | | |
|---|---|---|---|
| 5,678,334 A * | 10/1997 | Schoniger | 40/546 |
| 6,144,424 A | 11/2000 | Okuda et al. | |
| 6,530,164 B2 * | 3/2003 | Gai | 40/546 |
| 2005/0175282 A1 | 8/2005 | Wright et al. | |
| 2006/0080874 A1 * | 4/2006 | Eberwein | 40/564 |
| 2006/0291241 A1 * | 12/2006 | Wojtowicz et al. | 362/604 |
| 2007/0124970 A1 * | 6/2007 | Hjaltason | 40/546 |
| 2010/0107459 A1 * | 5/2010 | Hill | 40/443 |
| 2010/0180476 A1 | 7/2010 | Welch et al. | |
| 2010/0214228 A1 * | 8/2010 | Sailer et al. | 345/169 |
| 2011/0013423 A1 * | 1/2011 | Selbrede et al. | 362/613 |

FOREIGN PATENT DOCUMENTS

| | | |
|---|---|---|
| DE | 10145477 | 3/2002 |
| EP | 0333502 | 9/1989 |
| EP | 0355805 | 2/1990 |
| EP | 0377309 | 7/1990 |
| EP | 0403162 | 12/1990 |
| EP | 0539496 | 2/1992 |
| EP | 0549679 | 4/1992 |
| EP | 0495273 | 7/1992 |
| EP | 0500089 | 8/1992 |
| EP | 0506116 | 9/1992 |
| EP | 0531939 | 3/1993 |

(Continued)

OTHER PUBLICATIONS

IPRP/Written Opinion from PCT/US2007/014095.

*Primary Examiner* — Casandra Davis
(74) *Attorney, Agent, or Firm* — Avery Dennison Corporation (57) ABSTRACT

A method and system for an illuminated display. The display can include a first image that may be illuminated by a light source and a second image that may be illuminated by a light source. The light source may be a plurality of light emitting diodes (LEDs) and the LEDs and uniform illumination may be achieved through the use of waveguides. Additionally, the display may be such that it is flexible and that it may be mounted in any of a variety of locations and onto any of a variety of objects.

19 Claims, 5 Drawing Sheets

(56) References Cited

FOREIGN PATENT DOCUMENTS

| | | |
|---|---|---|
| EP | 0534140 | 3/1993 |
| EP | 0535402 | 4/1993 |
| EP | 0607261 | 4/1993 |
| EP | 0608269 | 4/1993 |
| EP | 0613541 | 5/1993 |
| EP | 0570562 | 6/1993 |
| EP | 0549890 | 7/1993 |
| EP | 0552967 | 7/1993 |
| EP | 0560605 | 9/1993 |
| EP | 0561329 | 9/1993 |
| EP | 0562802 | 9/1993 |
| EP | 0565764 | 10/1993 |
| EP | 0573051 | 12/1993 |
| EP | 0672263 | 4/1994 |
| EP | 0607930 | 7/1994 |
| EP | 0609816 | 8/1994 |
| EP | 0746787 | 9/1994 |
| EP | 0621500 | 10/1994 |
| EP | 0632229 | 1/1995 |
| EP | 0692777 | 7/1995 |
| EP | 0738413 | 7/1995 |
| EP | 0678761 | 10/1995 |
| EP | 0754337 | 10/1995 |
| EP | 0760962 | 10/1995 |
| EP | 0690429 | 1/1996 |
| EP | 0786129 | 4/1996 |
| EP | 0755040 | 7/1996 |
| EP | 0751340 | 1/1997 |
| EP | 0832392 | 1/1997 |
| EP | 0835464 | 1/1997 |
| EP | 0848848 | 3/1997 |
| EP | 0797045 | 9/1997 |
| EP | 0894318 | 10/1997 |
| EP | 0807917 | 11/1997 |
| EP | 0810086 | 12/1997 |
| EP | 0811859 | 12/1997 |
| EP | 1012647 | 4/1998 |
| EP | 0944799 | 6/1998 |
| EP | 0864905 | 9/1998 |
| EP | 1007370 | 11/1998 |
| EP | 1010160 | 1/1999 |
| EP | 0899707 | 3/1999 |
| EP | 1264134 | 6/1999 |
| EP | 1066615 | 9/1999 |
| EP | 1075687 | 11/1999 |
| EP | 0969311 | 1/2000 |
| EP | 1110029 | 3/2000 |
| EP | 1163473 | 8/2000 |
| EP | 1082638 | 9/2000 |
| EP | 1196910 | 10/2000 |
| EP | 1093651 | 11/2000 |
| EP | 1058227 | 12/2000 |
| EP | 1206769 | 3/2001 |
| EP | 1216467 | 4/2001 |
| EP | 1218664 | 4/2001 |
| EP | 1218665 | 4/2001 |
| EP | 1161754 | 7/2001 |
| EP | 1269452 | 8/2001 |
| EP | 1139013 | 10/2001 |
| EP | 1301743 | 1/2002 |
| EP | 1348210 | 6/2002 |
| EP | 1356442 | 8/2002 |
| EP | 1384223 | 10/2002 |
| EP | 1390936 | 11/2002 |
| EP | 1265096 | 12/2002 |
| EP | 1399907 | 12/2002 |
| EP | 1417438 | 2/2003 |
| EP | 1461564 | 4/2003 |
| EP | 1442446 | 5/2003 |
| EP | 1423836 | 10/2003 |
| EP | 1493050 | 10/2003 |
| EP | 1526793 | 1/2004 |
| EP | 1463016 | 9/2004 |
| EP | 1467336 | 10/2004 |
| EP | 1512583 | 3/2005 |
| EP | 1731932 | 12/2006 |
| WO | WO9516983 | 6/1995 |
| WO | WO2005001892 | 1/2005 |
| WO | WO2006009913 | 1/2006 |
| WO | WO2006017803 | 2/2006 |
| WO | WO20080153528 | 12/2008 |

* cited by examiner

ILLUMINATED GRAPHICAL AND INFORMATION DISPLAY

CROSS-REFERENCE TO RELATED APPLICATION

The present application claims priority to International Patent Application No. PCT/US2007/014095, which was published on Dec. 18, 2008, and is incorporated herein by reference in its entirety.

FIELD OF THE INVENTION

This invention relates generally to the field of displays and more particularly to the field of displays illuminated through the use of light emitting diodes.

BACKGROUND

Standard visual displays take on a variety of forms. Static displays showing a drawn or photographed image have long been used to convey a message or promote an idea. Additionally, in the field of advertisements, traditional posters with an image and some text are often used. These are frequently used outdoors and in areas of high traffic, so as to get the subject matter of the poster greater exposure. More recently, alterable displays have allowed for the use of lighting in conjunction with the static display to enhance or otherwise alter the display.

Yet other advertisements may be made using flat panel display technologies. These displays are readily changeable and editable and can be made to display any of a variety of images or text. These displays are, however, often very expensive, thus making them impractical for many uses. For example, it would not be desirable to place or mount a flat panel display in an area where it could be easily damaged or removed by an unauthorized person.

Still other displays use light guides to illuminate all or part of the display. A light guide can be a hollow box-shaped structure defining an optical cavity or a solid light-guiding plate. The guide can have a surface that is illuminated by light directed into the guide in a direction generally parallel to that surface. The light may be supplied from one or more light sources arranged on an edge of the light guide. Traditional light guides, however, are often expensive and may not allow for the positioning of the display to be altered or have proper or desired distribution of the light throughout the light guide. Moreover they do not allow for the variation of an image or the display of images on different layers.

SUMMARY

An embodiment of the invention includes a display apparatus on a license plate. The display can include at least one light source disposed on the license plate and a front panel with license plate data printed thereon. The license plate may further have a first layer having a first image to be illuminated thereon and a first backlight layer disposed behind the first layer. Vehicle identifying characters or any other characters may then be illuminated on a display portion of the license plate.

In another exemplary embodiment, a display apparatus on a traffic sign is described. The traffic sign may be any type of sign that may be found along or above a roadway and may contain any type of road sign information. The display apparatus on the traffic sign may be similar that described with respect to the license plate and may be illuminated to show any message, such as a message regarding the present condition of the road on which the traffic sign is displayed.

In yet another exemplary embodiment, a display apparatus disposed on a vending machine is described. The vending machine may be any type of vending machine which vends any type of product or product. The vending machine may have an illuminated panel that displays a static image. A display may be incorporated into the panel and may have a separate light source, allowing for any type of message or image to be displayed on the outer panel of the vending machine.

BRIEF DESCRIPTION OF THE FIGURES

Advantages of embodiments of the present invention will be apparent from the following detailed description of the exemplary embodiments thereof, which description should be considered in conjunction with the accompanying drawings in which.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

The word "exemplary" is used herein to mean "serving as an example, instance, or illustration." Any embodiment described herein as "exemplary" is not necessarily to be construed as preferred or advantageous over other embodiments. Likewise, the terms "embodiments," "embodiments of the invention," "exemplary embodiments" and similar terms do not require that all embodiments of the invention include the discussed feature, advantage or mode of operation.

Generally referring to FIGS. 1-7, a flexible illuminated display is described. The display may be in the form of a poster having one or more active illuminated monochrome overlays. The display may further include a waveguide that allows for homogenous light distribution to the display while maintaining the ability of the display to be flexible.

Figure 1A:
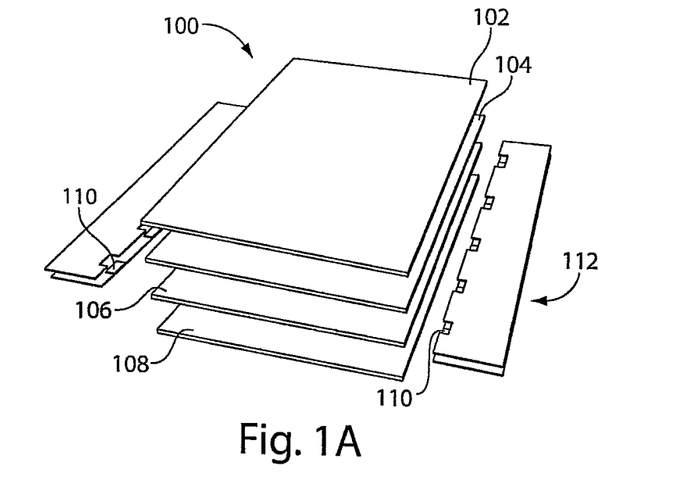
FIG. 1A is an exemplary exploded, top-down view of a display.
Figure 1B:
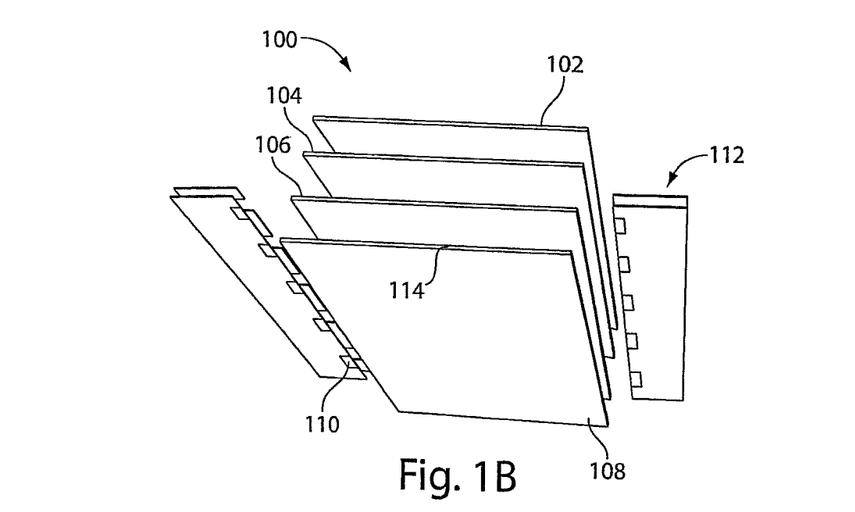
FIG. 1B is an exemplary exploded, bottom-up view of a display.

In one exemplary embodiment, as shown in FIG. 1, a flexible illuminated display is described. The display 100 is such that a fixed or static image and/or text may be shown on an outer face of the display, for example on graphics film 102. Graphics film 102 may be disposed over diffuser 104, waveguide 106 and back reflector 108. An additional image and/or text, for example image or text generated through the use of light emitting diodes (LEDs) 110, may be generated so that the additional image and/or text may be shown along with the fixed image on graphics film 102. The image or text generated by the LEDs 110 may be altered to show a desired image or text. LEDs 110 may be mounted to one or more frame members 112 disposed on any part of the periphery of the display. Additionally, frame members 112 can be formed in such a manner to act as heat sinks. The display 100 may also utilize frame member 112 to allow display 100 be mounted in any of a variety of positions or orientations, as well as in any of a variety of different locations. Additionally, display 100 can be used for any of a variety of purposes, for example it may be used as an advertisement display panel.

An exemplary exploded view of a display 100 is shown in FIGS. 1a and 1b. Graphics film 102 is shown as an outermost layer in FIG. 1a and could be the outermost layer on the display 100 after it is mounted. Graphics film 102 may be any material, for example any material that may have an image printed onto or otherwise disposed on the material. Graphics film 102 may also be thin, for example approximately 30 μm thick, conformable to a variety of surfaces, contours or imperfections, and may include an adhesive. Any adhesive disposed on graphics film 102 can be such that allows graphics film 102 to be self-adhering, for example when adhering graphics film 102 to diffuser 104. Graphics film 102 may also have any indicia printed on it, for example an image such as those used in advertisements and may be displayed more prominently when all or parts of the image are illuminated. Additionally, graphics film 102 may be such that it can provide color correction to any colors distorted by other portions of display 100.

In a further exemplary embodiment shown in FIGS. 1a and 1b, a diffuser 104 may be used as a component of the poster. In one example, an approximately 80 degree FWHM, 127 μm diffuser 104 may be incorporated. The diffuser 104 may have a transmission efficiency of at least about 85% and a spectral range of about 365 nm to 1600 nm. Additionally, the diffuser 104 may have a brightness uniformity of about less than 85% and could provide for cosmetic defects not to exceed approximately 1000 microns. The diffuser 104 may further have a temperature range of about −30 degrees C. to about 100 degrees C. at 240 hours, and a humidity of about greater than +/−5% of 95% relative humidity at 24 hours. Additionally, the diffuser 104 may have an approximate refractive index of about PC=1.586, PE=1.640, AC=1.494 and Epoxy=1.586.

In a further exemplary embodiment, a plurality of LEDs 110 may be connected to a waveguide 106. The LEDs 110 used with the display 100 may be any kind, for example side emitting white light LEDs 110. Additionally, depending on the application, any number of LEDs 110 may be partially disposed or inserted into the waveguide 106 and the frame 112. The number of LEDs 110 used with an individual display 100 may depend on the size of the display 100, as well as the orientation of the display 100. For example, a large display 100 may use more LEDs 110 than a smaller display 100. Similarly, a display 100 oriented in landscape position may use more LEDs 110 than the same display 100 oriented in portrait position. Alternatively, the same number of LEDs 110 may be used regardless of the type or size of the display 100. LEDs 110 may be mounted in mounting areas disposed on frame 112 and may further be partially disposed in waveguide 106. Also, as discussed further below, LEDs 110 may be positioned or spaced in any of a variety of manners, including uniformly and non-uniformly, on frame 112.

In a further exemplary embodiment, any type of waveguide 106 may be used. In one exemplary embodiment, a flat or flexible waveguide 106 may be utilized. The waveguide 106 may be sized according to the size of the display. Further, the waveguide may be made out of any desired material, for example acrylic, or any other material known to one having ordinary skill in the art. The waveguide 106 may be an element of the display 100 that can guide or direct the light from the LEDs 110. The waveguide 106 may be such that it accepts push-fit wide angle LEDs 110. In one exemplary embodiment, approximately 50 to 56 LEDs 110 may be fitted into the waveguide 106. The LEDs 110 may also have a separation of approximately 5 cm, which may vary, in some exemplary embodiments, depending on the location of the LEDs on the waveguide 106 and with respect to scatterer 114. Additionally, it may offer a high lumen efficacy. The waveguide 106 may also be thin, for example about 5 mm at a central portion and about 10mm at an edge portion, which can allow for improved light distribution and may also allow the packaging of the display 100 to remain relatively thin and thus allow for the mounting of the display 100 in any of a variety of locations and orientations. The waveguide 106 utilized in an exemplary embodiment may also utilize passive thermal cooling, in order to prevent damage from excess heat. The display 100 may also have a waveguide 106 and LED 110 combination that allow for a maximum viewing angle, brightness and homogeny.

As described above, some exemplary embodiments of the display 100 may use about 50 mm as a distance for LED 110 separation on the waveguide 106 in order to achieve a uniform light output. Still other embodiments may space the LEDs 110 are varying intervals. In a further exemplary embodiment, in order to keep the temperatures of the display 100 in an ideal operating range, approximately 0.006 $m^2$ of surface area per LED may be used. A scatterer 114 may also be used to provide for an improved viewing angle. The scatterer 114 may be formed through the use of silk screen printing and, in one exemplary embodiment, may use dots approximately 500 μm in diameter in one scatter profile. The scatter profile of the dots may be made in any of a variety of manners. In some exemplary embodiments, the scatter profile may have a higher concentration of dots may be disposed at edge areas of the scatterer 114 and a lower concentration of dots towards a central portion of the scatterer 114.

A scatterer 114 coupled with LEDs 110 having a separation of about 5 cm therebetween, for example, may allow for a lead-in region at an edge of the scatterer 114. The lead-in region can be an area where there is little or no light from adjacent LEDs 110 and may form a dark region or region of non-uniform light having an area of about 10 $cm^2$. The design of the lead-in region of the scatterer 114, as well as the high-to-low dot concentration of the scatter profile, in addition to the separation of the LEDs 110, for example by about 5 cm, may provide for a desired overlap of light from LEDs 110 outside of the lead-in region and may allow for an increase in the uniformity of light in the display 100.

The mechanical design of the display 100 may include an edge design for the frame 112. Any material, for example extruded aluminum, may be used in this design and may be utilized in order to maintain a lower overall weight of the product. Additionally, the frame 112 design, construction and materials may allow for passive thermal cooling, such as through the use of heat sinks on frame 112. Incorporating heat sinks into frame 112 may allow for the dimensions and weight of the display 100 to be kept low. For example, integral heat sinks disposed around the display 100 may eliminate the need for a heat sink to be disposed on the rear of the display. Thus the depth of the display 100 may be reduced and allow for the display 100 to be mounted flush to another object. Additionally, the heat sinks could provide for all of the necessary cooling of display 100 to maintain a proper operating temperature. Also, any mounting hardware may be disposed on a back portion of the display 100 without affecting the cooling of the display 100. The frame 112 design may also provide a fixture for accurate alignment and mounting of LEDs 110 and waveguide 106. For example, the frame 112 may include mounting or seating points for LEDs 110 so that LEDs 110 may be positioned in predetermined locations with respect to waveguide 106 and scatterer 114. The frame 112 may also be positioned in such a manner as to cover areas of non-uniform light. For example, the frame 112 may be designed so as to extend over the lead-in region made by the spacing of the LEDs 110 and the scatterer 114.

In a further exemplary embodiment, the frame 112 may be such that mechanical stability is maintained through the use of the design. The frame 112 of the display 100 may also be substantially thin, for example approximately 1 cm, so as to provide for low weight and ease of mounting. The frame 112 may also include an aesthetically appealing design. Further, additional design aspects may be incorporated so as to allow the frame 112 to conceal any areas of the display 100 that may not be uniformly illuminated, for example the edges of the displayed image. Additionally, the frame 112 may have any dimensions, depending on the desired size of the display. In one embodiment, the frame 112 may extend about 1.45 cm (0.57 inches) above and below the display 100 and about 9.93 cm (3.91 inches) on the left and right side of the display 100. Additionally, in one exemplary embodiment, the frame 112 may have dimensions of about 78.33 cm (30.84 inches) by 72.75 cm (28.64 inches).

In a further exemplary embodiment, the combination of materials used as well as the design of the individual components may allow for a relatively low overall weight of the display 100. A low weight may help ease the mounting and dismounting process of the display 100, as well as allowing for a display 100 to be mounted for a longer period of time, reducing mechanical stresses on a hanging mechanism. As discussed previously, the display may be made in any of a variety of sizes. Some exemplary embodiments allow the display to be made in international standard (ISO) paper sizes, such as A0, A1, etc. Sizing the displays in such a format can allow for the use of known graphics film 102 to be used for the printing of a first image for the display, which can reduce manufacturing time and costs. Also, other components, such as the scatterer 114, which may be printed using silk screening, may be printed in standard sizes, further reducing the time and cost of manufacture. Additionally, forming the displays in an international standard (ISO) paper size can allow for some off-the-shelf components to be used in the manufacture of the display, such as standard size framing. Further, if the display is formed in an ISO size, the display may be more compatible to fitting with or mounting on certain objects.

Thus, in one exemplary embodiment, a display 100 may be made in A0 size (approximately 841 mm by 1149 mm) and have an overall weight of approximately 8.174 kg. This weight can include an acrylic waveguide 106 weighing approximately 7.66 kg, aluminum heat sinks 112 weighing approximately 0.348 kg, a metallic frame cover (e.g. aluminum) weighing approximately 0.116 kg and internal items, such as LEDs 110, wires and graphics film 102 and diffuser films 104 weighing approximately 0.05 kg. In another exemplary embodiment, a display 100 in A1 size (approximately 594 mm by 841 mm) may be made having a weight of approximately 4.207 kg. This display 100 can include acrylic waveguide 106 weighing approximately 3.83 kg, aluminum heat sinks 112 weighing approximately 0.245 kg, a metallic frame cover (e.g. aluminum) weighing approximately 0.082 kg and internal items, such as LEDs 100, wires and graphics film 102 and diffuser films 104 weighing approximately 0.05 kg. However, the display can also be made in any desired standard or non-standard size.

The display 100 may also include a variety of electronics. These can include LEDs 110 and a power supply 206. For example, a plurality of LEDs 110 may be mounted on printed circuit board internal to the display casing and wired in series. The display can also include a power supply that, in one exemplary embodiment, generates approximately 200-250V of isolated output, 0.5 amps of constant current and 120 watts.

In another exemplary embodiment generally shown in FIGS. 2-6, a plurality of overlays may be used to form a display. Here, the display 200 can include an image 202, such as an image printed on graphics film 102, as described above. Display 200 can be used for any of a variety of purposes, for example advertising. Image 202 may be printed in such a manner as to be interchangeable, allowing for the removal and replacement of the image 202, if desired. For example, a sheet, layer or film onto which image 202 is printed may be removed from display 200 and replaced with a different image. Display 200 may further include a housing 204, which can be configured to house any of a variety of electrical and mechanical components used with display 200. The components inside housing 204 may include a light source, optics and a mounting or alignment bracket, which are elaborated upon later. Housing 204 may also be connected to power supply 206, and power supply 206 may be any type known to one having ordinary skill in the art.

Figure 2:
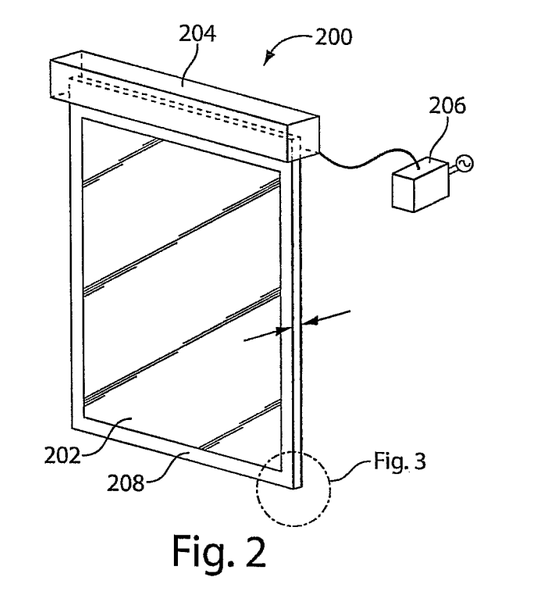
FIG. 2 is an exemplary front view of a display.
Figure 4:
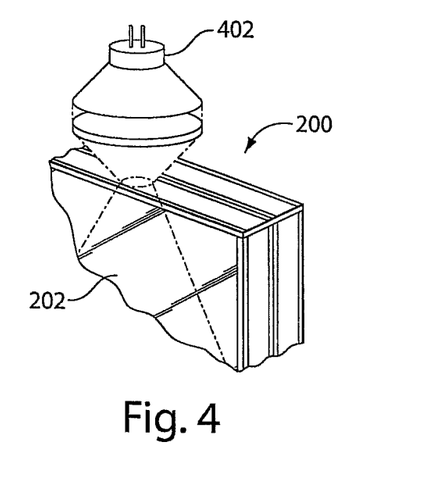
FIG. 4 is another exemplary cross sectional view of a display.
Figure 5:
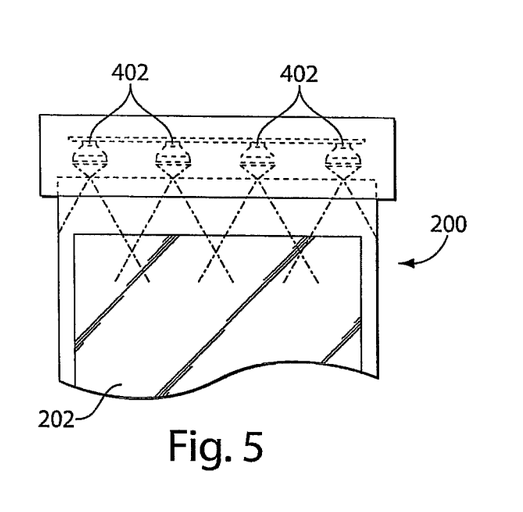
FIG. 5 is an exemplary view of a top portion of a display.

Further, similar to the above exemplary embodiments, a light source 402, such as an LED array, may be connected to one or more waveguides. In one exemplary embodiment, as shown in FIGS. 2, 4 and 5, the light source 402 may be disposed in housing 204 and positioned at the top of the display 200, which is oriented in the portrait position in this exemplary embodiment. In other exemplary embodiments, housing 204 may be located at the bottom of display 200 or another housing may be included at the bottom of display 200 in addition to the housing at the top portion of the display 200. Alternatively, housings could be disposed on either or both sides of display 200 as well. The light source 402 may further be connected to a power supply 206, which may in turn be plugged into any standard power outlet known to one having ordinary skill in the art. The light source 402 may function similarly to those described above, insofar as a plurality of LEDs may be positioned at predetermined intervals, for example on the frame 112, for example about 5 cm apart, along any or all sides of the display 200 and above a waveguide. As shown in exemplary FIG. 5, the light 502 is transmitted from light source 402 to at least one waveguide, such as backlight layer 304 or 308. The at least one waveguide guides the light to the necessary locations, and may form a flat backlight, allowing for the desired and uniform illumination of one or more images. Additionally, some undesired light may be prevented from interfering with the image or images to be displayed by being covered by framework 208.

Figure 3:
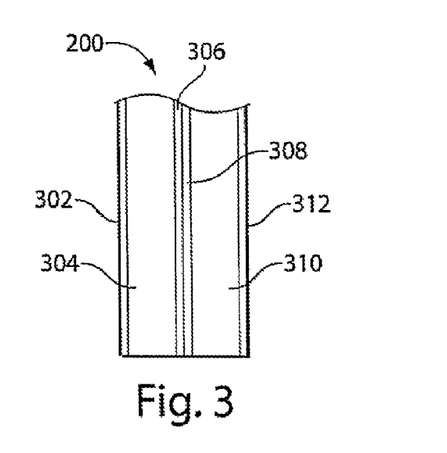
FIG. 3 is an exemplary view of a cross section of a display.

In a further exemplary embodiment, both the front backlight 304 and the rear backlight 310 may have an inhomogeneous pattern on their backsides in order to create homogeneous light distribution. The waveguide may further be formed using digital printing, which can allow for the waveguides to have flexibility without affecting their light guiding properties.

As further shown in FIG. 3, which is an enlarged, cross-sectional view of the circled area in FIG. 2, the light from the light source 402 may be transmitted through a first waveguide to produce backlight layer 304, which may, in turn, illuminate the front image 302 and display the front image 302 to a viewer or provide additional illumination to the front image 302. Front image 302 may be any type of image, for example a drawing or photograph, and may include any type of text or other indicia. Additionally, backlight layer 304 may have a thickness of about 0.3 mm to 2.0 mm. Transmission and scattering layer 306 may then be provided behind backlight layer 304. The transmission and scattering layer 306 may function similarly to scatterer 114 described above and can allow light from the backlight layer 304 to provide additional illumination to the rear image 308. Transmission and scattering layer 306 may also allow for the illuminated image of rear image 308 to be seen in conjunction with front image 302.

Figure 7A:
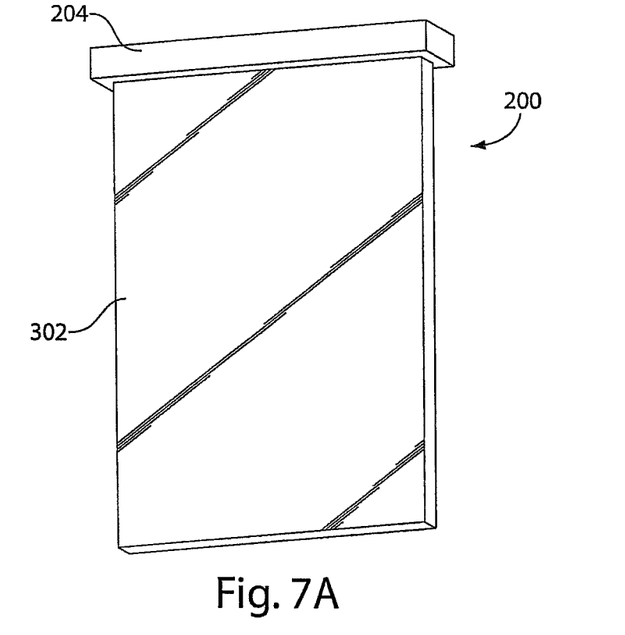
FIG. 7A is an exemplary view of a display without a second image.
Figure 7B:
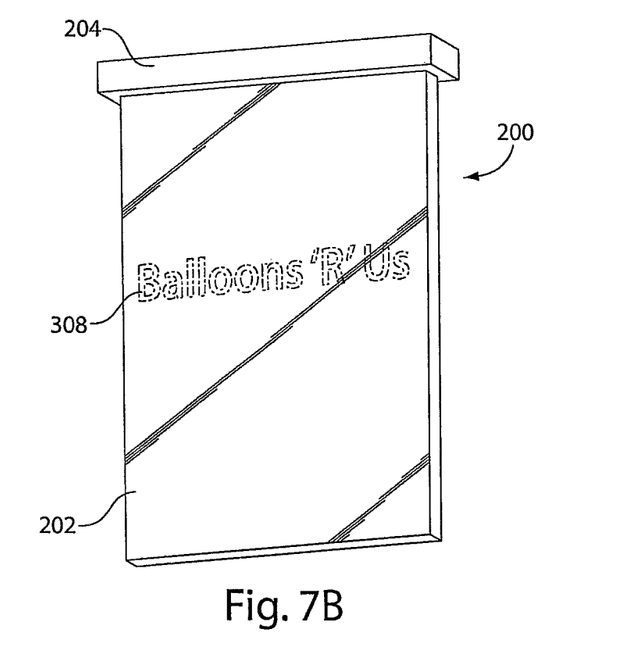
FIG. 7B is an exemplary view of a display with a second image.

Behind the transmission and scattering layer 306 can be the back image 308, such as image 308 shown in FIG. 7b. The back image 308 may be illuminated, as described previously, either separately or concurrently with the front image 302, through the use of light transmitted through the second backlight layer 310, and through the use of some of the light passing through the transmission and scattering layer 306. A reflective and scattering layer 312 may then be disposed behind the rear backlight layer 310. The reflective and scattering layer 312 prevents the light from the rear backlight layer 310 from being transmitted through the rear of the display 200 and reflects in the direction of the back image 308. In an alternative embodiment, any number of images may be incorporated into the display so that more than two images may be overlaid and, when illuminated, may be visible to a viewer of display 200. This may be accomplished, for example, by replacing reflective and scattering layer 312 with a transmission and scattering layer, and by disposing another image and backlight behind the transmission and scattering layer. The layering may be similar to that of components 302 through 306.

Figure 6:
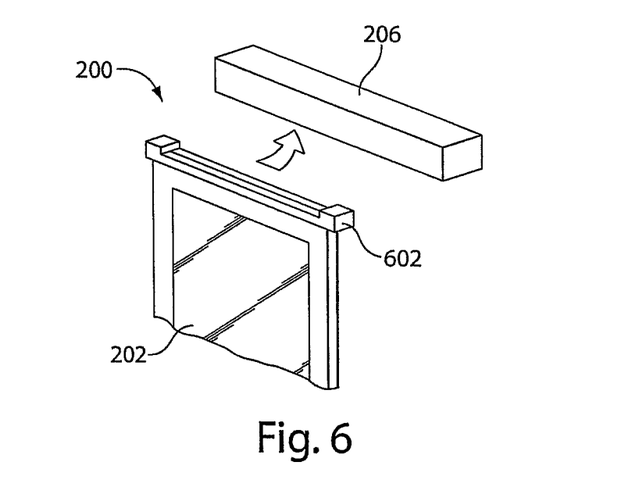
FIG. 6 is another exemplary view of a top portion of a display.

In yet another embodiment, as shown in FIG. 6, a mounting bracket 602, may be disposed at a top portion of the display 200, whether it is oriented in portrait or landscape fashion. The mounting bracket 602, which may be similar in manufacture to frame 112 described above, may be housed inside housing 204 when display 200 is mounted and attached to the housing 204. Mounting bracket 204 may also facilitate the connection of the display 200 to the housing 204 and may allow for the connection or mounting of the display 200 to another object.

In one exemplary embodiment of the above description, the display 200 may have a minimum brightness level of about 500 cd/m$^2$. Similar to the aforementioned embodiments, the display 200 may also be formed in any of a variety of sizes, such as the ISO paper sizes of A2, A1, A0 and double A0. Additionally, the display 200 may be oriented in any fashion, for example in a portrait or a landscape manner. Additionally, the display 200 may be such that after its manufacture, it may be positioned and activated easily by any authorized party.

In yet another exemplary embodiment, the display 200 may include one or more security features. For example, the display 200 may utilize an electronic key that would only allow authorized users or authorized materials to display indicia. The electronic key could be in the form of electrical materials formed in a graphics film, such as small silicon chip, or a conductive connection. These could allow for the completion of the electrical circuit when they are attached to the display 200 and thus could allow the display 200 to activate. In further exemplary embodiments, bar codes and bar code readers could be used to identify and activate individual display units. Still other exemplary embodiments could use SIM (subscriber identity module) cards used in conjunction with wireless radio modules to house display data and activate, for example remotely, a display 200.

In another exemplary embodiment, display 200 could utilize a graphics 102 film with magnetic particles, such as magnetic nano-particles that are not visible to the human eye. The display 200 could further have a one or more magnets, such as bar magnets, disposed therein. In one exemplary embodiment, one or more bar magnets could be located in a rear portion of waveguide 106. The display 200 could therefore be such that the magnetic particles in the graphics film 102 are keyed to the bar magnets in the waveguide so that only certain types of graphics film 102 having the desired magnetic particles could be attached thereto. Thus, some unauthorized or undesired uses of the display 200 could be prevented. Additionally, some of these security features could be used to remotely activate and display any of a variety of information on one or more displays 200.

Figure 8A:
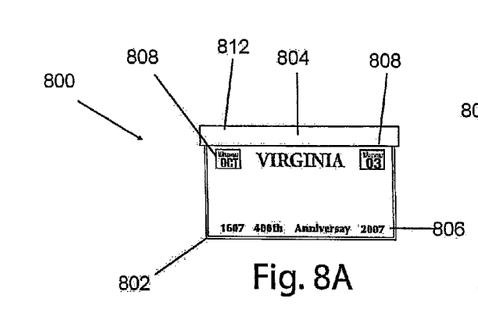
FIG. 8A is an exemplary view of a non-illuminated display used with a license plate.
Figure 8B:
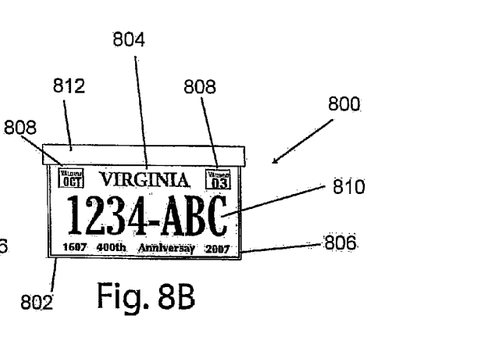
FIG. 8B is an exemplary view of an illuminated display used with a license plate.

In yet another exemplary embodiment, a display may be used with a standard license plate. In this embodiment, as shown in exemplary FIG. 8a, a license plate including a display 800 may be printed with standard state or issuing party information. As is well known in the art, license plates 802 can be made out of any of a variety of substances, including both metal and plastic. Here, as shown on the exemplary Virginia license plate 802, the state name 804, a logo 806, registration information and other standard identifying information may be printed on the plate. As shown in FIG. 8b, any other information, such as the characters 810 used in making the actual license plate numbers, may then be illuminated and displayed in a similar manner as above. The illuminated characters 810 may act to provide a clear display of the vehicle-identifying information in low light conditions. Additionally, the illuminated characters 810 could be utilized with the license plate 800 illuminating lights that are found on many cars and that are mandated by many states. Additionally, if any license plate lights on a car are non-functional, the characters 810 on a license plate 800 would still be legible to an observing party in low light conditions.

In another exemplary embodiment, the characters 810 in a license plate 800 number may be both printed and illuminated. Some states now produce flat license plates 800 that are digitally printed on a plastic material. Thus, for example, the characters 810 may be printed and shown on a regular license plate 800, such as the United States' standard size 15.24 cm by 30.48 cm license plate, or a license plate 800 of any other size or shape. Additionally, due to the manner in which some license plates 800 are now manufactured, a layered display, such as that described above with respect to other exemplary embodiments, may be made formed to function as a license plate 800. A first layer may be printed and include any information that may be desired to be shown on a license plate 800. The license plate 800 display may then include other information, such as text, that may be illuminated. Thus, in one example, the identifying characters 810 unique to a particular license plate may be illuminated in low ambient light situations.

The illumination of the license plate 800 may be accomplished through any of a variety of manners, such as through the use of LEDs. The LEDs may receive power from an attached power source, such as a battery located in housing 812, may be connected to the electrical system of an automobile or both. Additionally, a battery having a long life, for example many years, may be used to power the light source of the license plate 800 without interruption.

The illumination of the unique identifying characters 810, or any other desired characters, may be achieved through a manual switch that is operated by a user, an automatic switch that is designed to illuminate the license plate 800 at a predetermined time, and/or an automatic switch that is designed to illuminate the license plate 800 when another automotive accessory is activated, such as the headlights, windshield wipers or the ignition. In yet another exemplary embodiment, a sensor may be associated with the illumination of the license plate 800 that detects ambient light levels and illuminates the characters on the license plate 800 when a low level of ambient light is detected.

In a further exemplary embodiment, the characters 810, image or images that are illuminated on a license plate 800 may be secured from unauthorized access tampering. The security measures could be incorporated similarly to those described above. Alternatively, other still security measures could be employed. For example, each license plate 800 could have a chip, such as an RFID tag, embedded therein. The image or characters 810 to be displayed could then be transmitted to the chip or a signal activating the illumination of the image or characters. Alternatively, any other method or apparatus known to one having ordinary skill in the art could be used to secure the license plate against unauthorized access or tampering.

In yet a further exemplary embodiment, the face of license plate 800 may have a prismatic or beaded reflective or retroflective film, or any other type of sheet material with lens elements enclosed, disposed thereon. A prismatic reflective film may be a material that uses microprisms and cube cornered geometry to reflect light. A beaded reflective film may be a material that uses microscopic beads that have a metallized coating to reflect light. The film may be such that it can be applied to metallic license plate 800 blanks before any indicia is stamped to them or it may be applied to plastic license plate 800 blanks after any desired indicia is printed thereon. The film may be applied in transparent or translucent form and may or may not have any graphics printed thereon at the time of its application to the license plate 800. After the film is applied, the license plate 800, or any other substance upon which the material is disposed, may reflect an amount of light and increase the visibility or legibility of the license plate 800.

For example, a reflective film having a prismatic layer may be disposed on a license plate 800. As stated above, the reflective film may be any type, for example a film having a cover layer, a prismatic or beaded layer, a reflective layer, an adhesive layer and a release liner. The reflective film may be used with both flat license plates and license plates having raised areas, i.e. the film may have an elongation property that allows it to stretch over areas of a license plate that may have been stamped with any desired identifying characters 810 or other indicia, such as state name 804 or logo 806. The film may be applied over identifying characters 810 or any display incorporated into license plate 800. The reflective film may be such that it covers the identifying characters 810 completely or it may be such that it covers only part or none of the identifying characters 810. After the film is disposed over the desired areas of the license plate 800, the license plate 800 may reflect a greater amount of light than a plate without a reflective film disposed thereon and therefore may be easier to read, view or identify than a plate without the reflective film in a variety of light conditions.

Additionally, in this and any of the exemplary embodiments described herein, the license plate display 800 may include an electronic data storage device. An electronic data storage device may be used to house information, such as vehicle identifying characters 810, issuing party information, vehicle owner information or any other type of data, such as state name 804 or logo 806. Thus, data could be stored with the license plate 800 and authorized parties using any tools known to one having ordinary skill in the art may extract and view the data stored in the electronic storage device.

In yet another exemplary embodiment, the manufacture and distribution of license plates 800 could be enhanced. For example, any number of license plates 800 could be manufactured at a centralized manufacturing center and blank license plates 800, insofar as they would not include vehicle identification data, could be distributed to various departments of motor vehicles (DMVs) or other locations that are responsible for distributing license plates 800 to vehicle owners. At the time they register their vehicle or vehicles, vehicle owners could go to the DMV and present any necessary paperwork and pay any necessary fees. A DMV employee could then input vehicle identification characters 810 or any other indicia, in any manner known to one having ordinary skill in the art, into a blank license plate 800. This activated plate or plates 800 could then be presented to the vehicle owner, who could then immediately affix the plate or plates 800 to his or her vehicle. This could expedite, for example, the process of going to a DMV and requesting a personalized license plate 800 or any other license plate 800. In this exemplary embodiment, the appropriate characters 810 could be inputted into a blank license plate 800 and the plate 800 could be presented to the vehicle owner immediately, rather than having to wait for the printing of a license plate 800 with the appropriate characters 810.

Figure 9A:
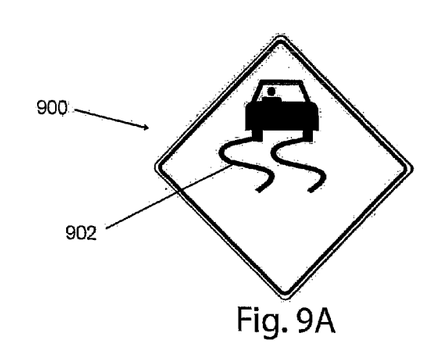
FIG. 9A is an exemplary view of a non-illuminated display used with a traffic sign.
Figure 9B:
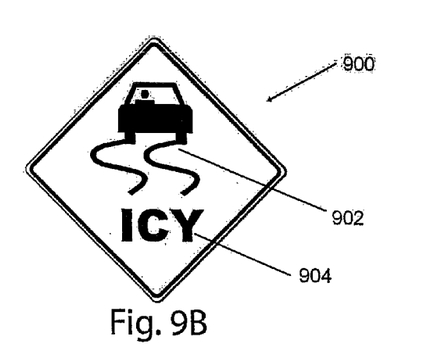
FIG. 9B is an exemplary view of an illuminated display used with a traffic sign.

In yet another exemplary embodiment, shown in FIGS. 9*a* and 9*b*, a flat light illuminator may be utilized with traffic signs. In this embodiment, as shown in FIG. 9*a*, any known traffic sign 900 may be printed and any known information 902 may be displayed. The displayed information may be any type of information for a driver, such as road condition, traffic condition, weather condition, road name, or advertisement, hereinafter referred to as road sign information 902. However, when it would be relevant or desirable to display any other information, that information may be illuminated and displayed to any passing motorists or other observers. Thus, as shown in the exemplary figure, a standard diamond-shaped traffic sign 900 may include road sign information 902 that the road ahead is slippery. The sign 900 may be made in any manner and, in one exemplary embodiment, utilize the layered construction process described above. In one exemplary embodiment shown in FIG. 9*b*, additional character 904 may be illuminated. For example when rain, snow, ice or any other precipitation are predicted or detected, the word "ICY" 904 may be illuminated to further warn motorists of a potential hazard. In another exemplary embodiment, the traffic sign 900 may convey any type of traffic information and may display any desired text, image or other road sign information 904. The word "ICY", or any desired characters 904 that one may want to display, may be activated through the use of a switch mounted on the sign 900 or through the use of a remote switch. Additionally, in another exemplary embodiment, a sensor may be disposed on the traffic sign 900 that detects the presence of precipitation or any other type of traffic hazard and automatically illuminates the sign 900 when one or more predetermined conditions is/are met. In another example, the sign 900 may be illuminated when ambient light levels decrease below a certain level so as to aid drivers in viewing the sign and any potential road hazards or conditions that they should be aware of.

Figure 10A:
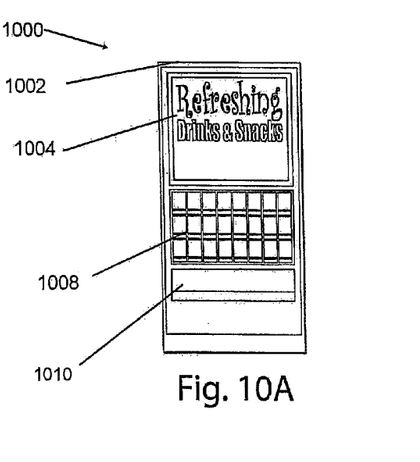
FIG. 10A is an exemplary view of a non-illuminated display used with a vending machine.
Figure 10B:
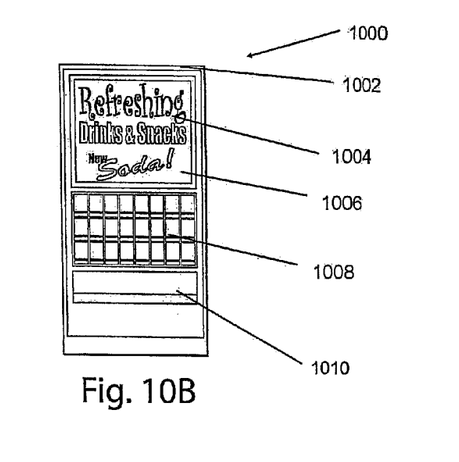
FIG. 10B is an exemplary view of an illuminated display used with a vending machine.

In another exemplary embodiment shown in FIG. 10, a flat light illuminator may be used in conjunction with a vending machine. As shown in FIG. 10a, a standard front panel 1002 for a vending machine 1000 having vending machine information 1004 disposed thereon may be utilized. The front panel 1002 may be any type of display front known to one having ordinary skill in the art and may include a backlight that allows for the entirety of the front panel 1002 to be illuminated. Front panel 1002 may also be removable and replaceable. The vending machine 1000 may also have an area 1008 where a user of the vending machine 1000 can view the contents of the machine 1000 as well as an output area 1010 where any vended items may be dispensed. As is known in the art, vending machines 1000 often have backlights that illuminate the entirety of a front panel 1002, such as on soda machines, or that illuminate the contents of a machine, such as one candy dispensers. Thus, in this exemplary embodiment, a standard front panel 1002 of a vending machine may be illuminated. However, when a secondary message or other display indicia, in addition to the primary static display 1004 is desired, a second message on display 1006 may be illuminated. Display 1006 may be illuminated through the use of a secondary backlight, in addition to the backlight that may be used to illuminate front panel 1002. Any message may be displayed on display 1006, such as an advertisement, warning, advisement, or informational statement. The message 1006 could be activated either remotely or at the machine, and may be activated either manually or automatically.

As one example, a display 1006 could be show a message indicating the presence of a new or popular product in a vending machine. Alternatively, the display could show a message on a display 1006 about the inventory of an item or items in the vending machine 1000. In yet another example, a warning could be displayed as the message on display 1006, such as a warning not to tilt or rock the vending machine. In another example, a message could be displayed on display 1006 showing a contact phone number, email address or website that one could contact if they desired to obtain more information about a particular vending machine. Thus if an individual or company that owns a vending machine 1000 or vending machines changes any of their contact information, the information may be easily updated. Also, an advertisement for another product or service could be displayed as a second message on display 1006. Alternatively, the message could be automatically displayed on display 1006 when sensor detects that the vending machine has been moved, for example tilted.

In another exemplary embodiment, an advertisement for a product or service could be shown as the primary displayed indicia 1004 on an illuminated vending machine panel 1002. The display 1006 could then be used to promote or otherwise display the contents of the vending machine 1000. For example, if the vending machine 1000 was located in a movie theater, a removable illuminated panel 1002 could be coupled with the vending machine and could advertise a movie that is currently playing or will be playing soon in the theater. The display 1006 could then show a message or other indicia that indicates the contents of the vending machine 1000 and the respective prices for the contents.

The foregoing description and accompanying drawings illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A license plate, comprising:
   a license plate blank having a front face, the front face with or without first indicia provided thereon; and
   an illuminatable display on the front face, the display comprising:
   a conformable graphics film having second indicia printed thereon the second indicia distinct from the first indicia and illuminatable separate from the first indicia, the graphics film forming a first layer;
   a backlight layer disposed behind the first layer for illumination, the backlight layer provided by a waveguide having a light source proximate at least one edge thereof;
   a light scattering layer interspersed between the backlight layer and the first layer; and
   a reflective film disposed on the first layer of the display;
   wherein the light source of the display is connected to a power source.

2. The license plate of claim 1, wherein the second indicia includes a plurality of vehicle identifying characters.

3. The license plate of claim 1, wherein the second indicia includes vehicle registration data.

4. The license plate of claim 1, wherein the second indicia includes vehicle inspection data.

5. The license plate of claim 1, wherein the second indicia includes identifying indicia from a state that issued the license plate.

6. The license plate of claim 1, wherein the first indicia is includes identifying indicia from a state that issued the license plate.

7. The license plate of claim 1, wherein the light source is activated automatically when a predetermined level of ambient light is detected by a sensor.

8. The license plate of claim 1, wherein the light source is activated by a switch associated with an accessory in an automobile to which the license plate is attached when said accessory is activated.

9. The license plate of claim 1, further comprising: a security apparatus that prevents unauthorized parties from changing the second indicia.

10. A traffic sign with an illuminatable display, comprising:
    a traffic sign having a front face, the front face with or without first road sign information provided thereon; and
    an illuminatable display on the front face, the display comprising:
    a conformable graphics film having second road sign information printed thereon the second road sign information distinct from the first road sign information and illuminatable separate from the first road sign information, the graphics film forming a first layer;

a backlight layer disposed behind the first layer for illumination, the backlight layer provided by a waveguide having a light source proximate at least one edge thereof; and a light scattering layer interspersed between the backlight layer and the first layer; wherein the light source of the display is connected to a power source;

wherein the light source is activated automatically when a predetermined level of ambient light is detected by a sensor; and further wherein the light source is activated automatically when precipitation is detected by a sensor.

11. The traffic sign of claim 10, wherein the second road sign information indicates a road condition.

12. The traffic sign of claim 10, wherein the second road sign information indicates a traffic condition.

13. A vending machine with an illuminatable display, comprising:

a vending machine having a front panel, the front panel having first vending machine information displayed thereby; and an illuminatable display for separately displaying second vending machine information, the display provided on, embedded in, or provided behind a portion of the front panel, the display comprising:

a conformable graphics film having the second vending machine information printed thereon the second vending machine information distinct from the first vending machine information and illuminatable separate from the first vending machine information, the graphics film forming a first layer;

a backlight layer disposed behind the first layer for illumination, the backlight layer provided by a waveguide having a light source proximate at least one edge thereof; and a light scattering layer interspersed between the backlight layer and the first layer;

wherein the light source of the display is connected to a power source; and wherein the light source is activated automatically when a predetermined level of ambient light is detected by a sensor; and further wherein the light source is activated and the second vending machine information is displayed automatically when a sensor detects the vending machine is moved.

14. The vending machine of claim 13, wherein the second vending machine information is an advertisement for a new product.

15. The vending machine of claim 14, wherein the new product is vended by the vending machine.

16. The vending machine of claim 13, wherein the second vending machine information is a warning.

17. A traffic sign with an illuminatable display, comprising:

a traffic sign having a front face, the front face with or without first road sign information provided thereon; and an illuminatable display on the front face, the display comprising:

a conformable graphics film having second road sign information printed thereon the second road sign information distinct from the first road sign information and illuminatable separate from the first road sign information, the graphics film forming a first layer;

a backlight layer disposed behind the first layer for illumination, the backlight layer provided by a waveguide having a light source proximate at least one edge thereof; and a light scattering layer interspersed between the backlight layer and the first layer; wherein the light source of the display is connected to a power source;

wherein the light source is activated automatically when a predetermined level of ambient light is detected by a sensor and further wherein the light source is activated by a remote switch.

18. The traffic sign of claim 17, wherein the second road sign information indicates a road condition.

19. The traffic sign of claim 17, wherein the second road sign information indicates a traffic condition.

* * * * *